J. B. LEWIS.
Sorghum Evaporator.
No. 82,330.          Patented Sept. 22, 1868.
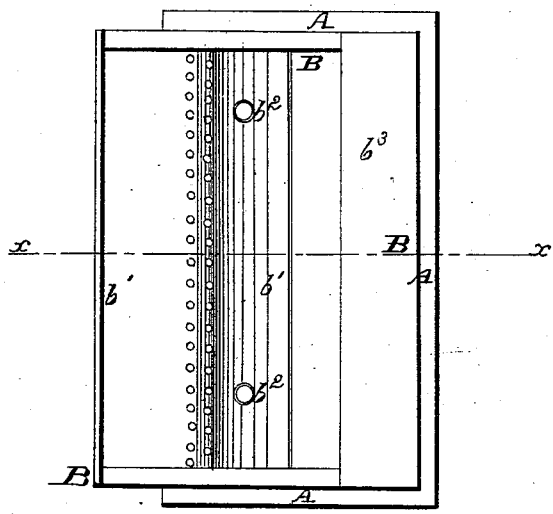
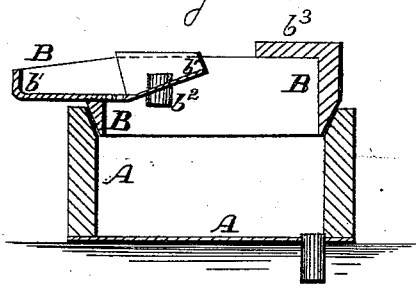
WITNESSES:
Wm A Morgan
G C Cotton
INVENTOR:
Jesse B. Lewis
per Munn & Co
Atty

United States Patent Office.

JESSE B. LEWIS, OF LINCOLN, OHIO.

Letters Patent No. 82,330, dated September 22, 1868.

IMPROVED SKIMMER FOR SORGHUM-EVAPORATORS.

The Schedule referred to in these Letters Patent and making part of the same.

TO ALL WHOM IT MAY CONCERN:

Be it known that I, JESSE B. LEWIS, of Lincoln, in the county of Gallia, and State of Ohio, have invented a new and useful Improvement in Sorghum-Evaporators; and I do hereby declare that the following is a full, clear, and exact description thereof, which will enable others skilled in the art to make and use the same, reference being had to the accompanying drawings, forming part of this specification, in which—

Figure 1 is a top view of an evaporating-pan, to which my improvement has been attached.

Figure 2 is a vertical cross-section of the same, taken through the line $x\ x$, fig. 1.

Similar letters of reference indicate like parts.

My invention has for its object to furnish an improved attachment for evaporating-pans, by means of which the pan may be made self-skimming, by the use of which a purer and better article may be manufactured, and with less labor than when the ordinary evaporating-pans are used.

It consists in the construction of the automatic skimmer-lid, and in its combination with the evaporating-pan, as hereinafter more fully described.

A represents an ordinary evaporating-pan, the bottom of which is made of sheet metal, and the sides and ends of which are formed of wood, in the usual manner, and which may be provided with a short pipe for drawing off the molasses or sirup. The inner upper edges of the sides and ends of the pan A are bevelled off, as shown in fig. 2, to form a seat for the lid B.

The sides and ends of the lid B are formed of wood, and the outer sides of their lower edges are bevelled off, as shown in fig. 2, to fit into the mouth of the pan A. The ends of the lid B have a shoulder formed upon them, so that the forward ends of their upper parts may project beyond the side of the pan A, as shown in figs. 1 and 2. The upper part of the front side of the frame of the lid B is cut away, as shown in the drawings, to receive the plate $b^1$, which is attached to the inner sides of the main parts of the ends of the lid B, to the lower edges of the projecting parts of said ends, and the front edge of which is turned up to form the forward side of the lid B.

The middle part of the metallic plate or bottom, $b^1$, is made horizontal, and its inner part is inclined upward till within about an inch of the upper edge of the wooden part or frame of said lid B, as shown in fig. 2. In the plate or bottom of the lid $b^1$, at the angle formed by the inclined and horizontal parts of said plate or bottom, is formed a series of small holes, as shown in fig. 1.

$b^2$ are two or more small pipes, leading through the inclined part of the plate $b^1$, and the upper ends of which are about an inch below the level of the upper edge of the said inclined part of the said plate $b^1$, as shown in fig. 2.

In using the apparatus, the juice to be evaporated is placed in the pan A, and the lid B arranged in place. As the juice rises with the application of heat, it flows over the upper edge of the inclined part of the plate $b^1$, carrying the scum with it, and flows down to the horizontal part of said plate, the juice flowing back through the perforations of the plate $b^1$ into the pan A, leaving the scum, which may be removed at leisure. When the juice is boiling rapidly, it may flow over the upper edge of the bottom, $b^1$, faster than it can drain off through the perforations in said plate. In this case, before the juice has risen to the upper edge of the inclined part of the plate $b^1$, it will reach the upper ends of the pipes $b^2$, and flow back through them into the pan A, thus guarding against any back flow of the juice and scum over the upper edge of said plate into the pan A.

The back part of the lid B is planked or covered over more or less, as may be desired, or necessary to shut in the heat sufficiently to cause the juice to flow freely.

The planking or cover $b^3$ may be made in one piece, as shown in the drawing, or it may be made in two parts, the rear part being stationary, and the front part being hinged to the said rear part, so that it may be adjusted to shut in the heat more or less closely, as may be desired. This latter construction I prefer.

Having thus described my invention, I claim as new, and desire to secure by Letters Patent—

1. The automatic skimmer-lid B, formed by attaching the perforated metallic plate $b^1$, constructed as described, and having pipes $b^2$ inserted in it to the wooden frame of said lid, substantially as and for the purpose set forth.

2. The combination of the automatic skimmer-lid B, constructed as described, with an ordinary evaporating-pan, A, substantially as and for the purpose set forth.

JESSE B. LEWIS.

Witnesses:
LEWIS NIDAY,
JAS. R. DRUMMOND.